(12) United States Patent
Ahuja et al.

(10) Patent No.: US 12,524,818 B2
(45) Date of Patent: Jan. 13, 2026

(54) OPT-IN DISTRIBUTED LEDGER CONSORTIUM

(71) Applicant: Bank of America Corporation, Charlotte, NC (US)

(72) Inventors: Yogi Ahuja, Warwick, PA (US); Mardochee Macxis, Concord, NC (US); Monika Kapur, Jacksonville, FL (US); Albena Fairchild, Indian Trail, NC (US); Utkarsh Raj, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 379 days.

(21) Appl. No.: 18/096,394

(22) Filed: Jan. 12, 2023

(65) Prior Publication Data
US 2024/0242294 A1     Jul. 18, 2024

(51) Int. Cl.
*G06Q 20/00* (2012.01)
*G06Q 20/38* (2012.01)
*G06Q 40/12* (2023.01)

(52) U.S. Cl.
CPC .......... *G06Q 40/12* (2013.12); *G06Q 20/389* (2013.01)

(58) Field of Classification Search
CPC ...... G06Q 40/12; G06Q 20/389; G06Q 20/02; G06Q 20/4016
See application file for complete search history.

(56) References Cited

U.S. PATENT DOCUMENTS

2020/0021444 A1*   1/2020   Young ................... H04L 9/3239
2020/0410820 A1*  12/2020   Ellis ..................... G06Q 20/405

* cited by examiner

*Primary Examiner* — Rokib Masud
(74) *Attorney, Agent, or Firm* — Weiss & Arons LLP

(57) ABSTRACT

Apparatus and methods for an opt-in distributed ledger consortium to detect and prevent fraudulent transactions are provided. Two or more entities may opt into a private distributed ledger. A program may receive financial transaction information. The program may record the transaction on the distributed ledger. The program may activate a smart application on the ledger. The smart application may analyze each transaction for indicators of illegal activity. When indicators of illegal activity are found within a transaction, the program may generate a report. The program may transmit the report to each entity that has opted into the private distributed ledger. The program may also record the report on the private distributed ledger.

18 Claims, 6 Drawing Sheets

| 403 Amount | 405 Origin | 407 Destination | 409 Sender | 411 Recipient | 413 Related Transactions? |
|---|---|---|---|---|---|
| $9,999 | A | Z | John | Jane | Yes |
| $2,000 | B | Y | Samantha | Company H | No |
| $3,746 | C | X | Company T | Ashley | No |
| $9,999 | A | W | John | Jill | Yes |

FIG. 4

OPT-IN DISTRIBUTED LEDGER CONSORTIUM

FIELD OF TECHNOLOGY

Aspects of the disclosure relate to providing apparatus and methods for an opt-in distributed ledger consortium to detect and prevent fraudulent transactions.

BACKGROUND OF THE DISCLOSURE

Currently, most financial institutions do not share much transaction information between each other. Financial institutions may also have a moral and legal obligation to reduce fraud and money laundering.

Typically, as part of anti-fraud and anti-money laundering ("AML") efforts, financial institutions will evaluate all information available about each transaction to detect potential fraud or money laundering. Some financial institutions may look at 300 or more different items of information or factors for each transaction. Some example factors may be: location of origin, location of destination, amount, sender, recipient, time of transaction, method of transaction (cash, wire, check, credit card, etc.), origin financial institution, destination financial institution, and other factors.

Malicious actors may avoid some scrutiny by spreading transactions around multiple financial institutions, as another AML factor may be number and volume of transactions.

Some financial institutions may be more efficient or accurate when performing anti-fraud and AML analysis on various transactions.

Private (conclave) distributed ledgers where the participants must opt-in before gaining access to the ledger may provide a secure location for financial institutions to share transaction information as well as anti-fraud and AML tools amongst each other. And a distributed ledger may spread the costs to each participant in the consortium.

Therefore, it would be desirable for apparatus and methods for an opt-in distributed ledger consortium to detect and prevent fraudulent transactions.

SUMMARY OF THE DISCLOSURE

It is an object of this disclosure to provide apparatus and methods for an opt-in distributed ledger consortium to detect and prevent fraudulent transactions.

An opt-in distributed ledger consortium computer program product is provided. The computer program product may include executable instructions. The executable instructions may be executed by a processor on a computer system.

The executable instructions may receive one or more financial transactions from an originating financial institution.

The instructions may record the one or more financial transactions on a private distributed ledger. Two or more financial institutions may have opted into the private distributed ledger.

The instructions may activate a smart application on the private ledger to analyze the one or more financial transactions for one or more indicators of illegal activity.

When one or more indicators of illegal activity are found, the instructions may generate a report including the one or more indicators and the one or more financial transactions. The instructions may transmit the report to each of the two or more financial institutions that are members of the opt-in consortium. The instructions may also record the report on the private distributed ledger.

The origin/originating financial institution may be one of the two or more financial institutions, and the private distributed ledger may include two or more methods of discovering indicators of illegal activity.

In an embodiment, each of the two or more financial institutions may be required to add one or more smart applications configured to discover indicators of illegal activity when opting into the private distributed ledger consortium.

In an embodiment, the private distributed ledger may be encrypted.

In an embodiment, the private distributed ledger may be a blockchain.

In an embodiment, the smart application may employ one or more artificial intelligence/machine learning ("AI/ML") algorithms.

In an embodiment, the smart application may compare the one or more financial transactions to one or more past financial transactions already recorded on the private distributed ledger.

In an embodiment, the instructions may analyze the one or more financial transactions and the one or more past financial transactions to discover one or more patterns of illegal activity.

In an embodiment, when one or more patterns of illegal activity are discovered, the instructions may generate a report including the one or more patterns and record the report on the private distributed ledger.

In an embodiment, the instructions may modify the smart application so that the smart application may detect the one or more patterns.

In an embodiment, the report may also be transmitted to a system administrator.

In an embodiment, the report may also be transmitted to a system administrator located at each of the two or more financial institutions.

In an embodiment, the report may be transmitted to a government agency.

In an embodiment, the report including the one or more patterns may be transmitted to a system administrator located at each of the two or more financial institutions.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which:

FIG. 4 shows an illustrative transaction log in accordance with principles of the disclosure.

DETAILED DESCRIPTION OF THE DISCLOSURE

Figure 1:
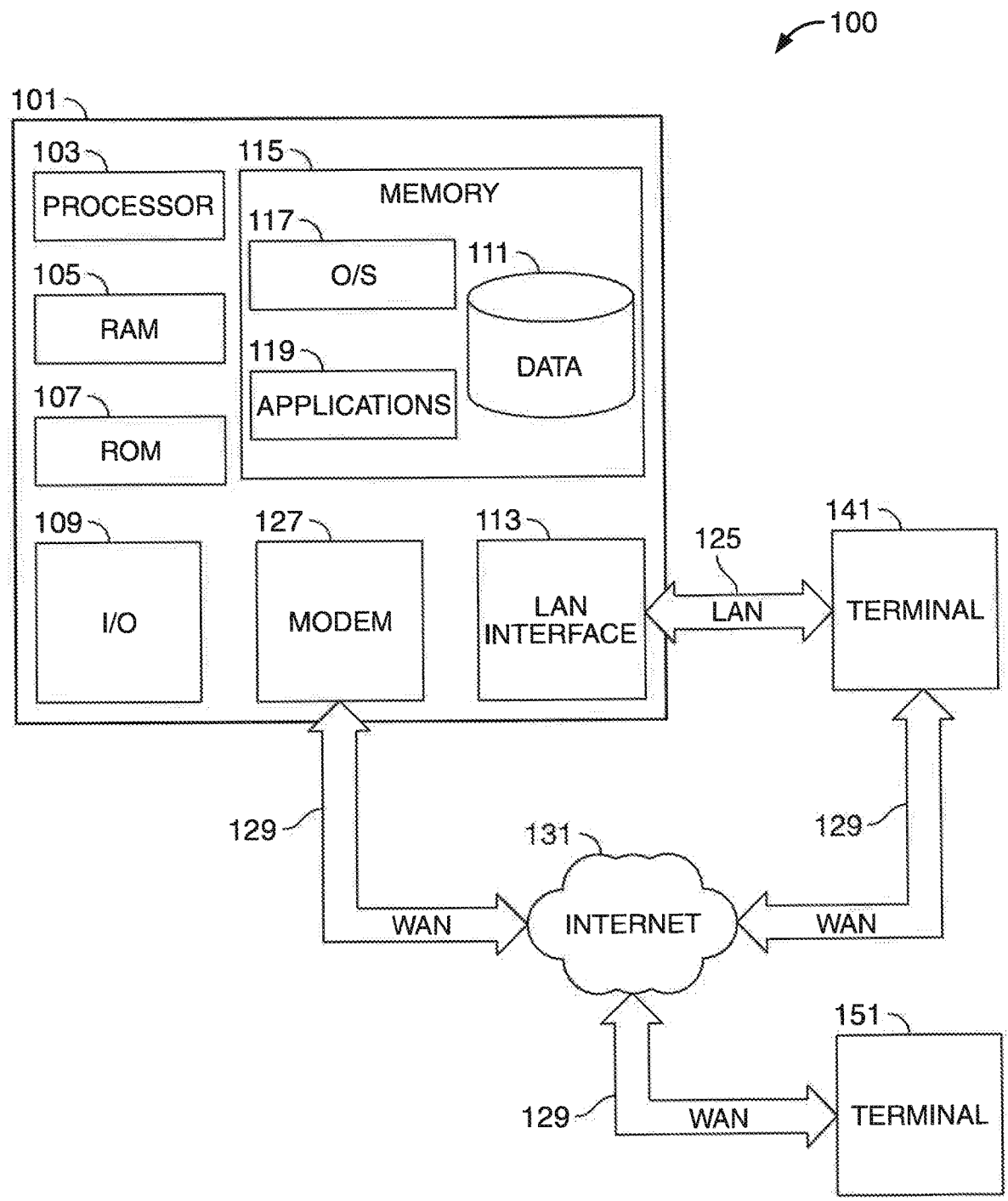
FIG. 1 shows an illustrative apparatus in accordance with principles of the disclosure.

It is an object of this disclosure to provide apparatus and methods for an opt-in distributed ledger consortium to detect and prevent fraudulent and money-laundering transactions.

An opt-in distributed ledger consortium computer program product is provided. The computer program product may include executable instructions stored on non-transitory memory. The executable instructions may be executed by a processor on a computer system.

Multiple processors may increase the speed and capability of the program. The executable instructions may be stored in non-transitory memory on the computer system or a remote computer system, such as a server.

Other standard components of a computer system may be present. The computer system may be a server, mobile device, or other type of computer system. A server or more powerful computer may increase the speed at which the computer program may run. Portable computing devices, such as a smartphone, may increase the portability and usability of the computer program, but may not be as secure or as powerful as a server or desktop computer.

The term "non-transitory memory," as used in this disclosure, is a limitation of the medium itself, i.e., it is a tangible medium and not a signal, as opposed to a limitation on data storage types (e.g., RAM vs. ROM). "Non-transitory memory" may include both RAM and ROM, as well as other types of memory.

The computer may include a communication link, a processor or processors, and a non-transitory memory configured to store executable data configured to run on the processor, among other components. The executable data may include an operating system and the automatic accessibility testing computer program.

A processor(s) may control the operation of the computer system and its components, which may include RAM, ROM, an input/output module, and other memory. The microprocessor may also execute all software running on the apparatus. Other components commonly used for computers, such as EEPROM or Flash memory or any other suitable components, may also be part of the apparatus.

A communication link may enable communication with other computers as well as any server or servers. The communication link may include any necessary hardware (e.g., antennae) and software to control the link. Any appropriate communication link may be used. In an embodiment, the network used may be the Internet. In another embodiment, the network may be an internal intranet or other network.

The computer system may be a server. The computer program may be run on a smart mobile device. The computer program, or portions of the computer program may be linked to other computers or servers running the computer program. The server or servers may be centralized or distributed. Centralized servers may be more powerful and secure than distributed servers but may also be more expensive.

The consortium may include each of the entities or individuals who have opted into the private distributed ledger. Typical entities may be financial institutions or government agencies. Requiring opt-in may create a more secure distributed ledger as well as limit access to prevent extraneous information from being shared or recorded on the ledger.

The executable instructions may receive one or more financial transactions from an originating financial institution. Any suitable method of transmitting the financial transactions may be utilized. The transactions may be received from a user (such as an administrator), another computer, a network location, or another program.

A financial transaction may include various data, such as sender, recipient, point of origin, destination, amount, date and time, and other information. Each financial transaction may also include metadata. Each financial transaction may be in any appropriate format or data type.

The instructions may record the one or more financial transactions on a private distributed ledger. The program may provide any data required by the distributed ledger, including metadata. Each financial transaction may be recorded into a singular record on the distributed ledger.

In an embodiment, a group of transactions may be recorded within a single record on the distributed ledger. The group may be categorized and grouped together based on various factors, such as sender, recipient, amount, time, etc. In an embodiment, the originating financial institution may group multiple financial transactions together. In another embodiment, the program may automatically group multiple financial transactions together based on an analysis of the data within each financial transaction.

In an embodiment, the instructions may convert the received financial transaction(s) from one data format to another format preferred by the distributed ledger. For example, the transactions may be received in a spreadsheet format, and then converted to a pdf format, or vice-versa.

Two or more financial institutions or other entities may have opted into the private distributed ledger. Multiple entities may form a consortium. Other entities, including government agencies may also opt into the ledger. Individuals may also opt into the ledger.

In an embodiment, entities or individuals may require an invitation to opt into the ledger. The distributed ledger may be invitation only. In other embodiments, an entity or individual may apply to join the distributed ledger consortium. Either an administrator or a group of the existing members (including some or all of the members) of the consortium may decide to allow or disallow the entity or individual into the consortium.

The instructions may activate a smart application on the private ledger to analyze the one or more financial transactions for one or more indicators of illegal activity. The smart application may be within particular records on the distributed ledger. The smart application may be referred to as a smart contract.

In an embodiment, the smart application may be added to each record when each record is recorded, by the distributed ledger. In another embodiment, the smart application may be added to each record by the program.

In an embodiment, the smart application may automatically analyze each transaction when that transaction is recorded on the ledger.

In an embodiment, the instructions may add the smart application to each transaction or set of transactions that it records on the ledger. For example, each transaction may be recorded on a separate record/block of the ledger. Each record may include information other than the financial transaction, such as the smart application/smart contract, metadata, and other information.

When one or more indicators of illegal activity are found, the instructions may generate a report including the one or more indicators and the one or more financial transactions. The report may be in any appropriate format. The report may be in any language. The report may be machine-readable. The report may be in plain text.

Indicators of illegal activity may include one or more of more than 300 different factors used to analyze a financial transaction, including, inter alia, origin location, destination location, amount, repetition, sender, recipient, and other factors.

The instructions may transmit the report to each of the two or more financial institutions or entities that are members of the opt-in consortium.

The instructions/program may also transmit the report to other locations, such as a government agency.

The instructions may also record the report on the private distributed ledger. Recording the report on the distributed ledger may allow for use of the report by other smart applications as well as create a further, immutable, record of suspicious activity.

The origin/originating financial institution may be one of the two or more financial institutions, and the private distributed ledger may include two or more methods of discovering indicators of illegal activity. Each method of discovering indicators of illegal activity may be included within one or more smart application. For example, one method may be programmed into one smart application, while a different smart application may apply a different method.

Each method may include the same or distinct factors, as well as various weights for each factor. Each method may rank the importance of each factor differently. For example, one financial institution may believe that five factors are the most important when looking for indicators of illegal activity. Another financial institution may believe that there are 17 different factors that are the most important.

In an embodiment, a user may login to a distributed ledger session through the Internet. Alternatively, the users may login through a local intranet, avoiding the Internet and its associated security risks.

In an embodiment, the private distributed ledger may be a blockchain.

Distributed ledger technology may refer to a decentralized, tamperproof and transactional database. A distributed ledger provides a distributed, immutable, transparent, secure and auditable ledger of changes to a file or document. The distributed ledger can be consulted openly and fully, allowing access to all documents/changes that have occurred since the initialization of the system, and can be verified and collated by any entity with access at any time. The distributed ledger also stores information in a fashion that prevents alteration of the records stored in the distributed ledger.

A conclave distributed ledger/blockchain may refer to a private network or ledger that can only be accessed by users or entities with the appropriate credentials, as opposed to a public blockchain, such as those used for some cryptocurrencies.

The distributed ledger may store information in linked segments, records, or a chain of "blocks." The linked blocks may collectively form a "blockchain." Each block may store a set of changes performed at a given time. Blocks are linked or chained to each other by a reference to the previous block. Each block in the distributed ledger is linked to the previously approved block using a cryptographic hash code of the previous block.

Security is accomplished by imposing strict rules and mutual agreement among nodes when attempting to add a new block of transactions to the distributed ledger. The strict rules and mutual agreement protocols may be referred to as a consensus mechanism. The consensus mechanism synchronizes the decentralized ledger across all nodes that write to the distributed ledger. The consensus mechanism ensures that all nodes agree on a single authoritative copy of the distributed ledger. Nodes that write to the distributed ledger network may be programmed to recognize the longest chain in a network of nodes as the authoritative source of information for the distributed ledger.

In this disclosure, proof of work and computationally intensive tasks may be unnecessary to add blocks to the blockchain, or add to the distributed ledger, as the disclosure deals with conclave (private) blockchains/ledgers. Any user may make a change to the document comprising the blockchain/ledger. The change, along with its metadata (user, time, location, etc.) may be sent as a new block to every other node/user in the blockchain/ledger. Every user/node may approve or disapprove of the change, and that record may be added as a new block to the blockchain/ledger along with its metadata. This may create an immutable record of every change and approval or disapproval. A malicious actor may not be able to modify any action taken in the past (change or approval/disapproval) as that modified action will not match the other nodes/users records of the blockchain/ledger. In addition, by limiting the nodes/users in a private blockchain, the users may be able to prevent malicious actors from gaining access at all, but that may depend on the strength of the authentication process used to access/login to the ledger/blockchain and any editing/approval session. The distributed nature of the block generation process may provide a tamperproof and auditable transactional database.

In an embodiment, each of the two or more financial institutions may be required to add one or more smart applications or methods configured to discover indicators of illegal activity when opting into or joining the private distributed ledger consortium. In this embodiment, a 'cost' of opting into the distributed ledger consortium may be that each financial institution may be required to share its methods of detecting illegal activity with the other members of the consortium.

In an embodiment, the private distributed ledger may be encrypted. Any suitable encryption method may be used.

In an embodiment, entities or individuals who opt into the distributed ledger consortium may be required to log into the distributed ledger through various authentication methods, including two-factor authentication, biometric authentication, and other suitable authentication methods.

In an embodiment, the private distributed ledger may be a blockchain. In other embodiments, other types of distributed ledgers may be used, such as holographs, hashgraphs, and directed acyclic graphs.

In an embodiment, the smart application may employ one or more artificial intelligence/machine learning ("AI/ML") algorithms. Any suitable AI/ML algorithm or combination of algorithms may be used.

In an embodiment, the smart application may compare the one or more financial transactions to one or more past financial transactions already recorded on the private distributed ledger.

In an embodiment, the instructions may analyze the one or more financial transactions and the one or more past financial transactions to discover one or more patterns of illegal activity.

In an embodiment, when one or more patterns of illegal activity are discovered, the instructions may generate a report including the one or more patterns and record the report on the private distributed ledger.

In an embodiment, the instructions may modify the smart application so that the smart application may detect the one or more patterns.

In an embodiment, the report may also be transmitted to a system administrator.

In an embodiment, the report may also be transmitted to a system administrator located at each of the two or more financial institutions.

In an embodiment, the report may be transmitted to a government agency. The government agency may or may not have opted into the distributed ledger consortium.

In an embodiment, the report including the one or more patterns may be transmitted to a system administrator or other user located at each of the two or more financial institutions.

An apparatus for an opt-in distributed ledger consortium is provided. The apparatus may include a plurality of servers. Each server may include: a server communication link, a server processor, and a server non-transitory memory.

The non-transitory memory may be configured to store at least: a server operating system, a copy of a private opt-in distributed ledger, and an opt-in distributed ledger application.

Each server may be assigned to one of two or more financial institutions.

The opt-in distributed ledger application may be configured to interact with the private opt-in distributed ledger. The application may receive one or more financial transactions from one of the two or more financial institutions. The application may record the one or more financial transactions on the private opt-in distributed ledger. The application may activate a smart application on the private opt-in distributed ledger to analyze the one or more financial transactions for one or more indicators of illegal activity.

When the application discovers one or more indicators of illegal activity, it may generate a report, transmit the report to each of the two or more financial institutions, and record the report on the private opt-in distributed ledger.

In an embodiment, each of the one or more financial transactions may include: an amount, an origination, and a destination.

In an embodiment, each of the one or more financial transactions may also include one or more related transactions.

In an embodiment, each of the one or more financial transactions may also include a sender and a recipient.

A method for an opt-in distributed ledger consortium is provided. The method may include the step of two or more financial institutions opting into a private distributed ledger. The method may include the step of receiving one or more financial transactions from one of the two or more financial institutions. The method may include recording the one or more financial transactions on the private distributed ledger. The method may include activating a smart application located on the private distributed ledger to analyze the one or more financial transactions for one or more indicators of illegal activity. When one or more indicators of illegal activity are found, the method may include the steps of generating a report, transmitting the report to each of the two or more financial institutions, and recording the report on the private distributed ledger.

In an embodiment, the method may include the step of analyzing two or more financial transactions recorded on the ledger for one or more patterns of illegal activity. When one or more patterns of illegal activity are discovered, the method may include the steps of generating a pattern report, transmitting the pattern report to each of the two or more financial institutions, and recording the pattern report on the private distributed ledger.

In an embodiment, the method may also include the step of incorporating the pattern report into the smart application, so that the smart application may analyze financial transactions for the pattern.

In an embodiment, the smart application may use one or more artificial intelligence/machine learning ("AI/ML") algorithms to analyze the one or more financial transactions for one or more indicators of illegal activity.

One of ordinary skill in the art will appreciate that the steps shown and described herein may be performed in other than the recited order and that one or more steps illustrated may be optional. Apparatus and methods may involve the use of any suitable combination of elements, components, method steps, computer-executable instructions, or computer-readable data structures disclosed herein.

Illustrative embodiments of apparatus and methods in accordance with the principles of the invention will now be described with reference to the accompanying drawings, which form a part hereof. It is to be understood that other embodiments may be utilized, and that structural, functional, and procedural modifications may be made without departing from the scope and spirit of the present invention.

As will be appreciated by one of skill in the art, the invention described herein may be embodied in whole or in part as a method, a data processing system, or a computer program product. Accordingly, the invention may take the form of an entirely hardware embodiment, or an embodiment combining software, hardware and any other suitable approach or apparatus.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

In accordance with principles of the disclosure, FIG. 1 shows an illustrative block diagram of apparatus 100 that includes a computer 101. Computer 101 may alternatively be referred to herein as a "computing device." Elements of apparatus 100, including computer 101, may be used to implement various aspects of the apparatus and methods disclosed herein. A "user" of apparatus 100 or computer 101 may include other computer systems or servers or computing devices, such as the program described herein.

Computer 101 may have one or more processors/microprocessors 103 for controlling the operation of the device and its associated components, and may include RAM 105, ROM 107, input/output module 109, and a memory 115. The microprocessors 103 may also execute all software running on the computer 101—e.g., the operating system 117 and applications 119 such as an opt-in distributed ledger program and security protocols. Other components commonly used for computers, such as EEPROM or Flash memory or any other suitable components, may also be part of the computer 101.

The memory 115 may be comprised of any suitable permanent storage technology—e.g., a hard drive or other non-transitory memory. The ROM 107 and RAM 105 may be included as all or part of memory 115. The memory 115 may store software including the operating system 117 and application(s) 119 (such as an opt-in distributed ledger program and security protocols) along with any other data 111 (historical data, configuration files, operating system) needed for the operation of the apparatus 100. Memory 115 may also store applications and data. Alternatively, some or all of computer executable instructions (alternatively referred to as "code") may be embodied in hardware or firmware (not shown). The microprocessor 103 may execute the instructions embodied by the software and code to perform various functions.

The network connections/communication link may include a local area network (LAN) and a wide area network (WAN or the Internet) and may also include other types of networks. When used in a WAN networking environment, the apparatus may include a modem or other means for establishing communications over the WAN or LAN. The modem and/or a LAN interface may connect to a network via an antenna. The antenna may be configured to operate over Bluetooth, wi-fi, cellular networks, or other suitable frequencies.

Any memory may be comprised of any suitable permanent storage technology—e.g., a hard drive or other non-transitory memory. The memory may store software including an operating system and any application(s) (such as an automatic accessibility testing program and security protocols) along with any data needed for the operation of the apparatus and to allow bot monitoring and IoT device notification. The data may also be stored in cache memory, or any other suitable memory.

An input/output ("I/O") module 109 may include connectivity to a button and a display. The input/output module may also include one or more speakers for providing audio output and a video display device, such as an LED screen and/or touchscreen, for providing textual, audio, audiovisual, and/or graphical output.

In an embodiment of the computer 101, the microprocessor 103 may execute the instructions in all or some of the operating system 117, any applications 119 in the memory 115, any other code necessary to perform the functions in this disclosure, and any other code embodied in hardware or firmware (not shown).

In an embodiment, apparatus 100 may consist of multiple computers 101, along with other devices. A computer 101 may be a mobile computing device such as a smartphone or tablet.

Apparatus 100 may be connected to other systems, computers, servers, devices, and/or the Internet 131 via a local area network (LAN) interface 113.

Apparatus 100 may operate in a networked environment supporting connections to one or more remote computers and servers, such as terminals 141 and 151, including, in general, the Internet and "cloud". References to the "cloud" in this disclosure generally refer to the Internet, which is a world-wide network. "Cloud-based applications" generally refer to applications located on a server remote from a user, wherein some or all of the application data, logic, and instructions are located on the internet and are not located on a user's local device. Cloud-based applications may be accessed via any type of internet connection (e.g., cellular or wi-fi).

Terminals 141 and 151 may be personal computers, smart mobile devices, smartphones, IoT devices, or servers that include many or all of the elements described above relative to apparatus 100. The network connections depicted in FIG. 1 include a local area network (LAN) 125 and a wide area network (WAN) 129 but may also include other networks. Computer 101 may include a network interface controller (not shown), which may include a modem 127 and LAN interface or adapter 113, as well as other components and adapters (not shown). When used in a LAN networking environment, computer 101 is connected to LAN 125 through a LAN interface or adapter 113. When used in a WAN networking environment, computer 101 may include a modem 127 or other means for establishing communications over WAN 129, such as Internet 131. The modem 127 and/or LAN interface 113 may connect to a network via an antenna (not shown). The antenna may be configured to operate over Bluetooth, wi-fi, cellular networks, or other suitable frequencies.

It will be appreciated that the network connections shown are illustrative and other means of establishing a communications link between computers may be used. The existence of various well-known protocols such as TCP/IP, Ethernet, FTP, HTTP, and the like is presumed, and the system can be operated in a client-server configuration. The computer may transmit data to any other suitable computer system. The computer may also send computer-readable instructions, together with the data, to any suitable computer system. The computer-readable instructions may be to store the data in cache memory, the hard drive, secondary memory, or any other suitable memory.

Application program(s) 119 (which may be alternatively referred to herein as "plugins," "applications," or "apps") may include computer executable instructions for an opt-in distributed ledger program and security protocols, as well as other programs. In an embodiment, one or more programs, or aspects of a program, may use one or more AI/ML algorithm(s). The various tasks may be related to running a distributed ledger as well as analyzing transactions for fraud, money laundering, or other illegal activities.

Computer 101 may also include various other components, such as a battery (not shown), speaker (not shown), a network interface controller (not shown), and/or antennas (not shown).

Terminal 151 and/or terminal 141 may be portable devices such as a laptop, cell phone, tablet, smartphone, server, or any other suitable device for receiving, storing, transmitting and/or displaying relevant information. Terminal 151 and/or terminal 141 may be other devices such as remote computers or servers. The terminals 151 and/or 141 may be computers where a user is interacting with an application.

Any information described above in connection with data 111, and any other suitable information, may be stored in memory 115. One or more of applications 119 may include one or more algorithms that may be used to implement features of the disclosure, and/or any other suitable tasks.

In various embodiments, the invention may be operational with numerous other general purpose or special purpose computing system environments or configurations. Examples of well-known computing systems, environments, and/or configurations that may be suitable for use with the invention in certain embodiments include, but are not limited to, personal computers, servers, hand-held or laptop devices, tablets, mobile phones, smart phones, other Computers, and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, IoT devices, and the like.

Aspects of the invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network, e.g., cloud-based applications. In a distributed computing environment, program modules may be located in both local and remote computer storage media including memory storage devices.

Figure 2:
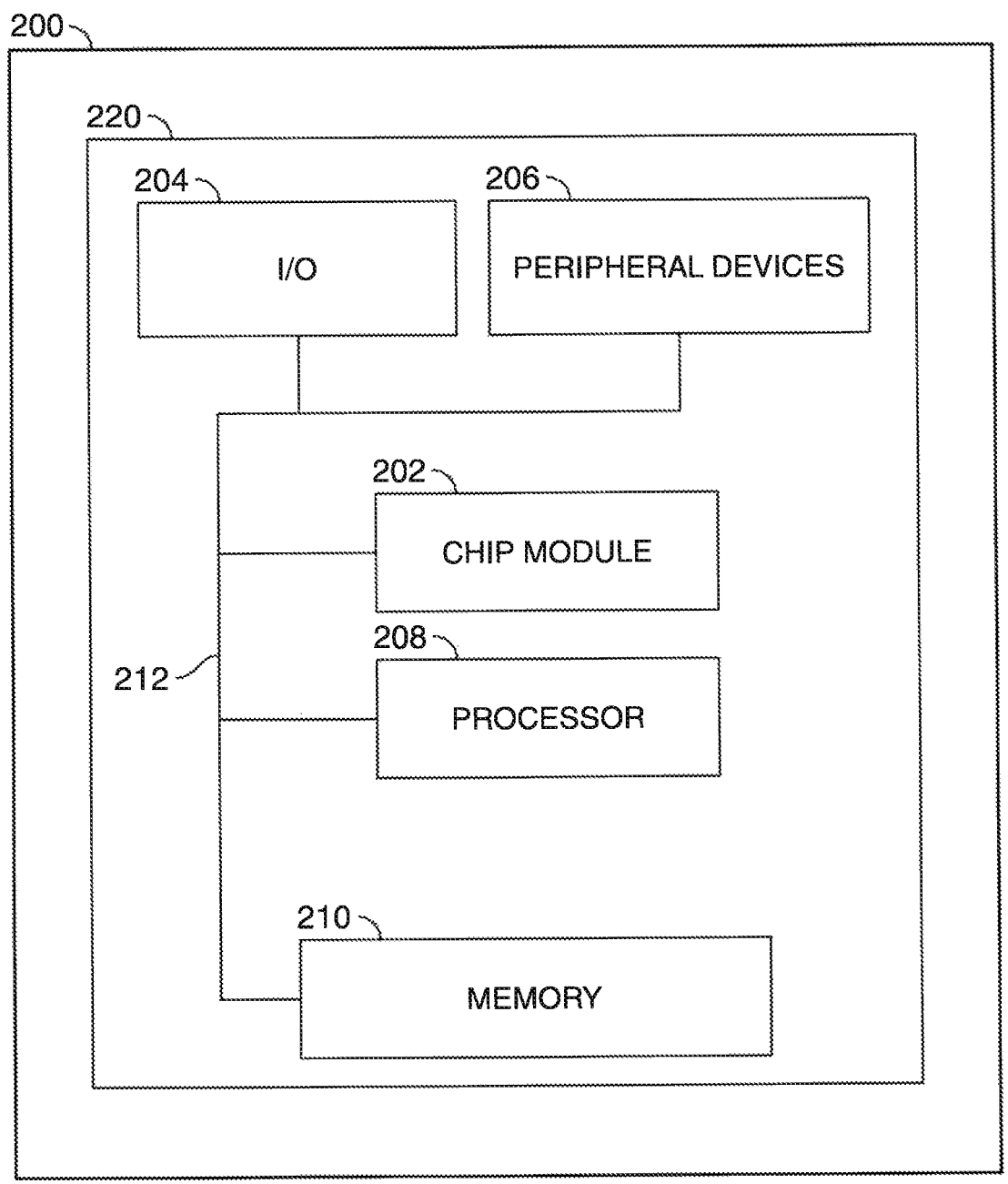
FIG. 2 shows an illustrative apparatus in accordance with principles of the disclosure.

FIG. 2 shows illustrative apparatus 200 that may be configured in accordance with the principles of the disclosure. Apparatus 200 may be a server or computer with various peripheral devices 206. Apparatus 200 may include one or more features of the apparatus shown in FIGS. 1-6. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device, an display (LCD, LED, OLED, etc.), a touchscreen or any other suitable media or devices; peripheral devices 206, which may include other computers; logical processing device 208, which may compute data information and structural parameters of various applications; and machine-readable memory 210.

Machine-readable memory 210 may be configured to store in machine-readable data structures: machine executable instructions (which may be alternatively referred to herein as "computer instructions" or "computer code"), applications, signals, recorded data, and/or any other suitable information or data structures. The instructions and data may be encrypted.

Components 202, 204, 206, 208 and 210 may be coupled together by a system bus or other interconnections 212 and may be present on one or more circuit boards such as 220. In some embodiments, the components may be integrated into a single chip. The chip may be silicon-based.

Figure 3:
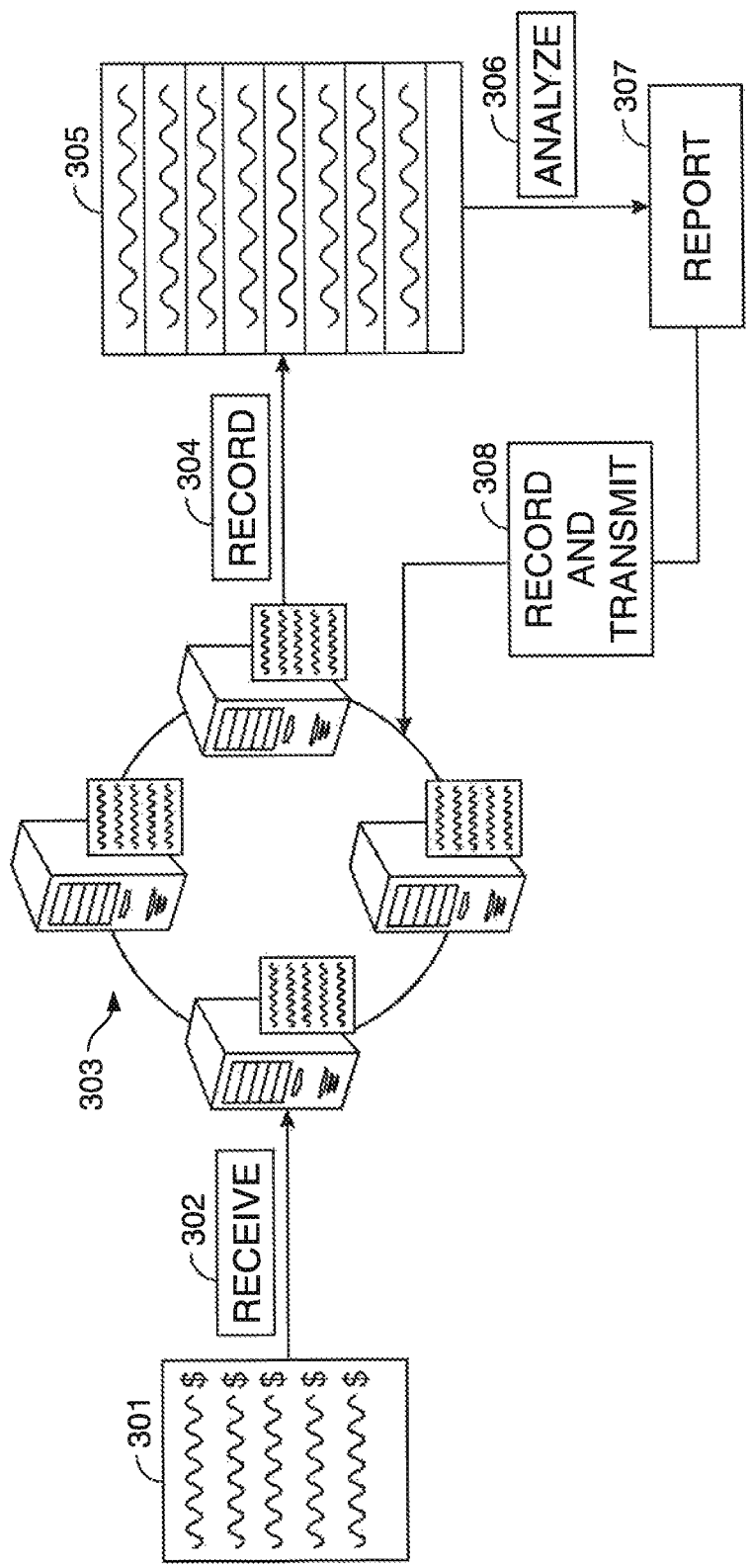
FIG. 3 shows an illustrative schematic in accordance with principles of the disclosure.

FIG. 3 shows an illustrative schematic in accordance with principles of the disclosure. Apparatus may include any of the components and systems odd-numbered 301 through 307, among other components. Methods may include some or all of the method steps even-numbered 302 through 308, as well as additional steps. Methods may include the steps illustrated in FIG. 3 in an order different from the illustrated order. The illustrative method shown in FIG. 3 may include one or more steps performed in other figures or described herein. Steps 302 through 310 may be performed on the apparatus shown in FIGS. 1-4, and 6 or other apparatus shown in other figures or described elsewhere.

The system may include a financial transaction log 301, a plurality of distributed computers 303 with access to a distributed ledger 305, and a report 307.

Each computer of the plurality of computers 303 may be a node on a distributed ledger network. Financial institutions may opt into the private distributed ledger 305 and set up one or more computers/servers as nodes on the distributed ledger network.

One or more financial transaction log 301 may be received by one or more of the distributed computers 303 at step 302. The computers 303 may include an access to the distributed ledger 305 (not shown).

The computers 303 may, at step 304, record the financial transaction log 301 on the distributed ledger 305.

At step 306, a smart application (not shown) on the ledger 305 may analyze the transaction log 301 for indicators or patterns of illegal activity, such as fraud or money laundering.

At step 308, the report of any indicators or patterns of illegal activity may be recorded on ledger 305 as well as transmitted to each computer or node on the distributed ledger network.

FIG. 4 shows an illustrative financial transaction log in accordance with principles of the disclosure. Financial transaction log 401 may include one or more financial transactions. Each financial transaction may include various data.

The data for each transaction may include, inter alia, an amount 403, an origin location 405, a destination location 407, a sender ID 409, a recipient ID 411, and an indication 413 of whether there are known related transactions or not. Other information may be included as well.

Origin location 405 and destination location 407 may be a geographical location. Origin location 405 and destination location 407 may be an IP address. Origin location 405 and destination location 407 may be a financial institution branch location. Origin location 405 and destination location 407 may include city, state, country, postal code, as well as other information.

Sender ID 409 and recipient ID 411 may include, inter alia, names, usernames, aliases, account numbers, and other identifying information.

Financial transaction log 401 may be encrypted.

Indication 413 of whether there are known related transactions or not may include a link to the related transaction or other identifying information for any related transaction.

In an embodiment, indication 413 of whether there are known related transactions or not may be deduced by a program or application through analysis of two or more transactions. The analysis may be through one or more artificial intelligence/machine learning ("AI/ML") algorithms.

Figure 5:
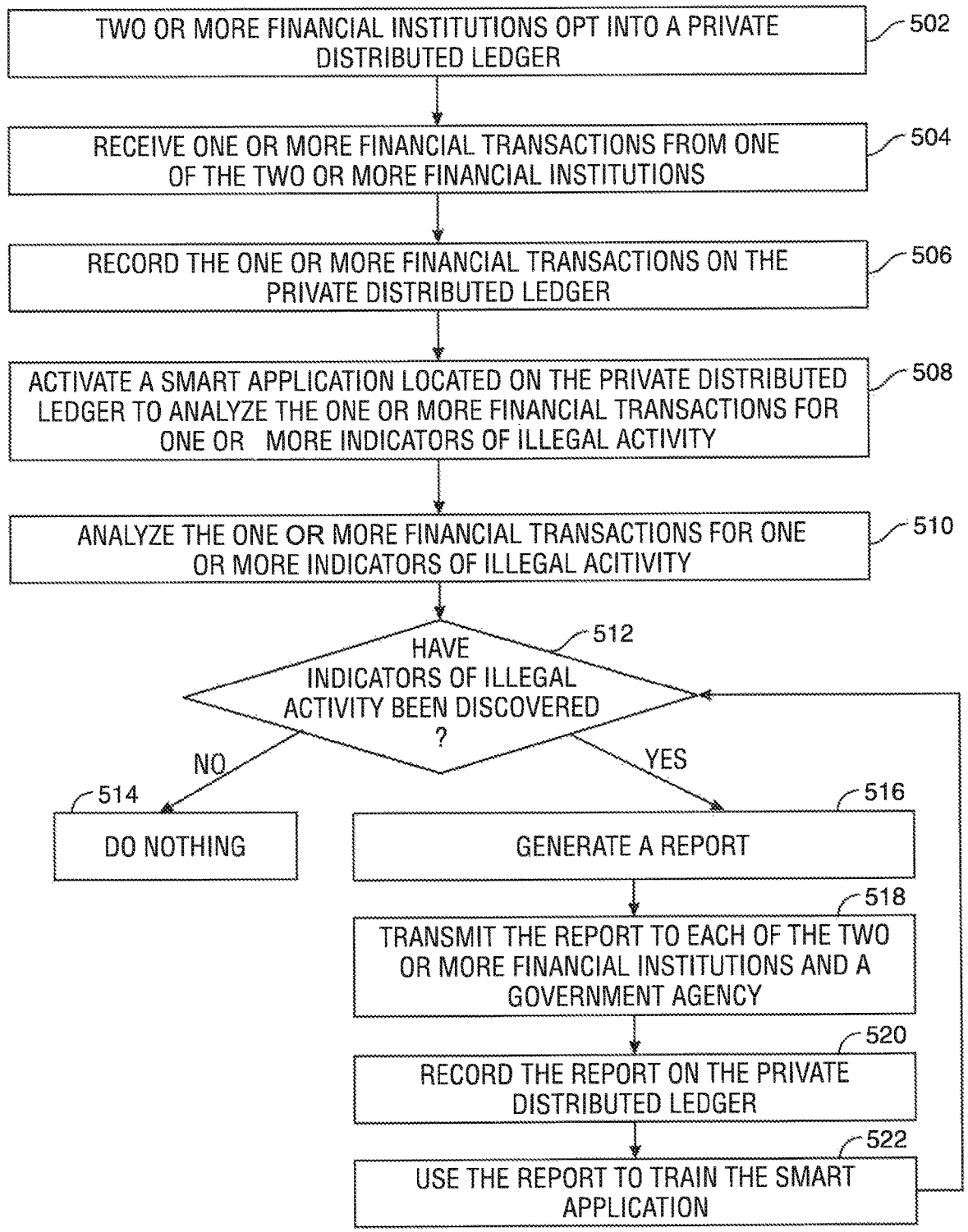
FIG. 5 shows an illustrative flowchart in accordance with principles of the disclosure.

FIG. 5 shows an illustrative flowchart in accordance with principles of the disclosure. Methods may include some or all of the method steps numbered 502 through 522. Methods may include the steps illustrated in FIG. 5 in an order different from the illustrated order. The illustrative method shown in FIG. 5 may include one or more steps performed in other figures or described herein. Steps 502 through 522 may be performed on the apparatus shown in FIGS. 1-4, 6 or other apparatus.

At step 502, two or more financial institutions or other entities may opt into a private distributed ledger. As the distributed ledger is private, the entities may only join if invited. The distributed ledger may be encrypted. The distributed ledger may require authentication, and increasingly advanced authentication (two-factor, biometric, etc.) every time an entity (or employee of the entity) views the distributed ledger or adds to the distributed ledger.

In an embodiment, the entity may be a government or government agency.

At step 504, an opt-in distributed ledger consortium computer program may receive one or more financial transactions from one of the entities that has opted into the distributed ledger. The financial transaction may be manually entered or automatically generated and transmitted. For example, after every transaction has been completed, or at an earlier stage (such as the request stage), a computer may transmit the transaction details to the distributed ledger program for analysis and inclusion on the distributed ledger.

At step 506, the program may record the transaction(s) received at step 502 on the distributed ledger. Once recorded on the distributed ledger, the information may not be changed due to the nature of the distributed ledger.

At step 508, the program may activate a smart application located on the distributed ledger. The smart application may be referred to as a smart contract. The smart application may analyze each of the transactions received at step 504 for indicators of illegal activity. These indicators may be one of 300 or more factors used to analyze a financial transaction. Not every factor will be applicable for every transaction.

At step 510, the smart application may analyze each of the financial transactions received at step 504.

The smart application may utilize one or more AI/ML algorithms for its analysis.

In an embodiment, the smart application may also look for patterns of illegal activity by analyzing multiple transactions.

At step 512, the program and/or the smart application may determine if indicators of illegal activity or patterns of illegal activity have been discovered by the smart application.

When no indicators have been discovered, at step 514, the program may do nothing. In an embodiment, the program may generate a report saying that no indicators of illegal activity have been discovered for this particular transaction or group of transactions.

When one or more indicators of illegal activity have been discovered in one or more financial transactions, the program may generate a report at step 516. The report may include information on the transaction as well as what indicator or indicators have been discovered.

At step 518, the program may transmit the report to each of the entities that have opted into the distributed ledger. In an embodiment, the program may also transmit the report to a government agency, even when the government agency has not opted into the distributed ledger.

At step 520, the program may record the report on the distributed ledger. Recording the report on the distributed ledger may create a historical record that may not be changed due to the nature of the distributed ledger.

At step 522, in an embodiment, the report may be used to train the smart application. An administrator may flag a report as correct or incorrect. This flag may then be fed back into the smart application as feedback. The feedback may be useful if the smart application uses one or more AI/ML algorithms.

Figure 6:
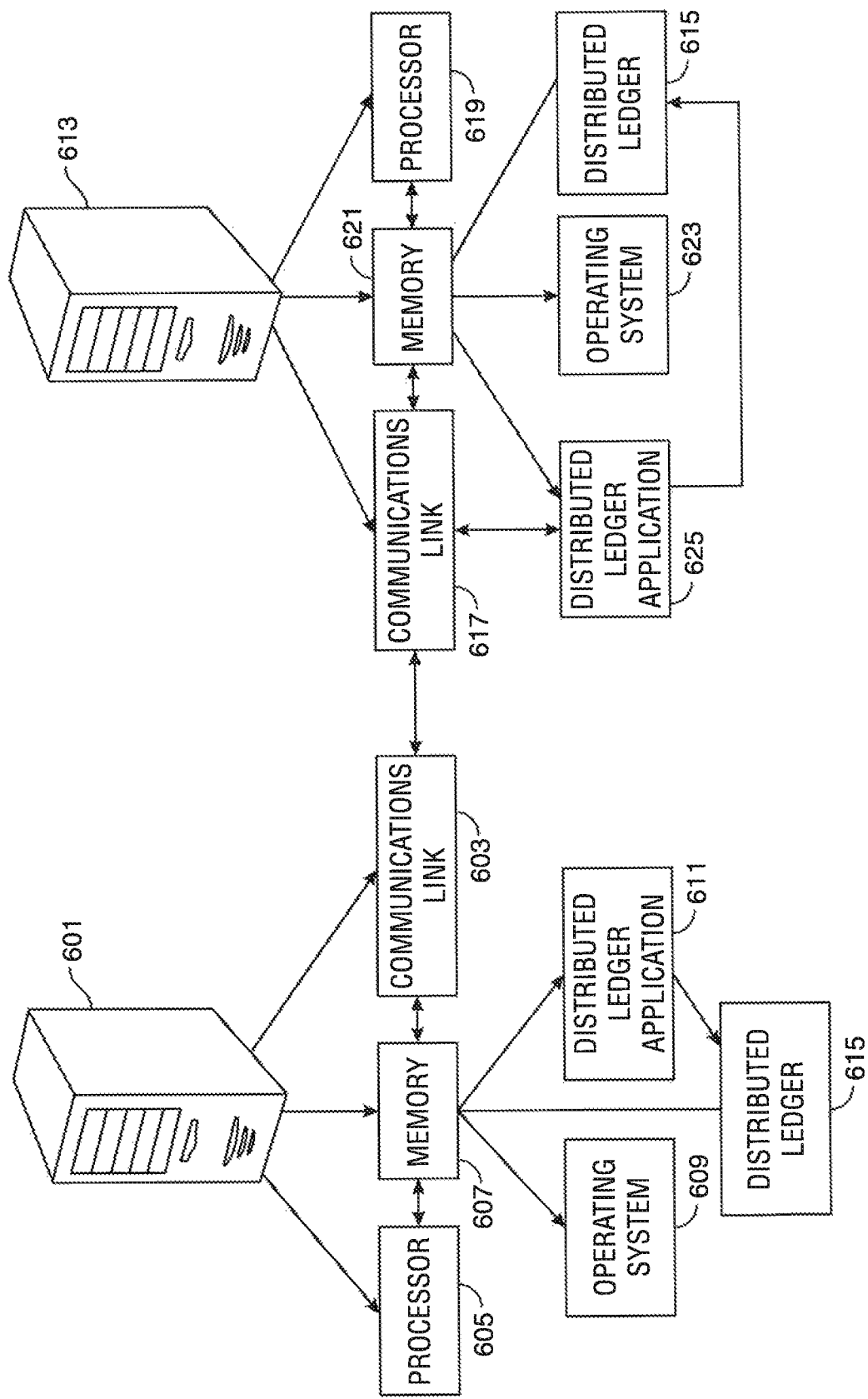
FIG. 6 shows an illustrative apparatus in accordance with principles of the disclosure.

FIG. 6 shows an illustrative apparatus in accordance with principles of the disclosure. The apparatus may include a plurality of servers. One server/computer 601 may include a communication link 603, a processor/processors 605, and a non-transitory memory 607, as well as other components. Another server/computer 613 may include a communications link 617, a processor or processors 619, and a non-transitory memory 621.

The non-transitory memory 607 may include an operating system 609, an opt-in distributed ledger program product/application 611, as well as other data and programs such as a distributed ledger 615.

The communications link 603 may communicate with the other computer/server 613 (as well as other servers/computers, not shown).

The non-transitory memory 621 may include an operating system 623, an opt-in distributed ledger program product/application 625, as well as a copy of the distributed ledger 615.

The opt-in distributed ledger application 611 or 625 may be configured to interact with the private opt-in distributed ledger 615.

The application 611 or 625 may receive one or more financial transactions from one of the two or more financial institutions. The application 611 or 625 may record the one or more financial transactions on the private opt-in distributed ledger.

The application 611 or 625 may activate a smart application on the private opt-in distributed ledger to analyze the one or more financial transactions for one or more indicators of illegal activity.

When one or more indicators of illegal activity are found, the application 611 or 625 may generate a report, transmit the report to each of the two or more financial institutions, and record the report on the private opt-in distributed ledger.

Thus, apparatus and methods for an opt-in distributed ledger consortium to detect and prevent fraudulent transactions are provided. Persons skilled in the art will appreciate that the present invention can be practiced by other than the described embodiments, which are presented for purposes of illustration rather than of limitation.

What is claimed is:

1. An anti-fraud and anti-money laundering ("AML") opt-in distributed ledger consortium computer program product, the computer program product comprising executable instructions, the executable instructions when executed by a processor on a computer system:
  receive one or more financial transactions from an origin financial institution;
  record the one or more financial transactions on a private distributed ledger, wherein two or more financial institutions have opted into the private distributed ledger at least by sharing one or more method of detecting illegal activity with the private distributed ledger;
  activate a smart application employing one or more artificial intelligence/machine learning ("AI/ML") algorithms to analyze the one or more financial transactions for one or more indicators of illegal activity; and
  when one or more indicators of illegal activity are found:
    generate a report;
    transmit the report to each of the two or more financial institutions; and
    record the report on the private distributed ledger;
  wherein:
    the origin financial institution is one of the two or more financial institutions; and
    the private distributed ledger includes two or more methods of discovering indicators of illegal activity.

2. The opt-in distributed ledger consortium computer program product of claim 1 wherein each of the two or more financial institutions is required to add one or more smart applications configured to discover indicators of illegal activity when opting in to the private distributed ledger consortium.

3. The opt-in distributed ledger consortium computer program product of claim 1 wherein the private distributed ledger is encrypted.

4. The opt-in distributed ledger consortium computer program product of claim 1 wherein the smart application compares the one or more financial transactions to one or more past financial transactions recorded on the private distributed ledger.

5. The opt-in distributed ledger consortium computer program product of claim 4 wherein the instructions analyze the one or more financial transactions and the one or more past financial transactions to discover one or more patterns of illegal activity.

6. The opt-in distributed ledger consortium computer program product of claim 5 wherein when one or more patterns of illegal activity are discovered, the instructions generate a report including the one or more patterns and record the report on the private distributed ledger.

7. The opt-in distributed ledger consortium computer program product of claim 6 wherein the instructions modify the smart application with the one or more patterns.

8. The opt-in distributed ledger consortium computer program product of claim 1 wherein the report is transmitted to a system administrator.

9. The opt-in distributed ledger consortium computer program product of claim 1 wherein the report is transmitted to a system administrator located at each of the two or more financial institutions.

10. The opt-in distributed ledger consortium computer program product of claim 1 wherein the report is transmitted to a government agency.

11. The opt-in distributed ledger consortium computer program product of claim 6 wherein the report is transmitted to a system administrator located at each of the two or more financial institutions.

12. An apparatus for an anti-fraud and anti-money laundering ("AML") opt-in distributed ledger consortium, the apparatus comprising:
a plurality of servers, each server including:
  a server communication link;
  a server processor; and
  a server non-transitory memory configured to store at least:
    a server operating system;
    a copy of a private opt-in distributed ledger; and
    an opt-in distributed ledger application;
wherein:
  each server is assigned to one of two or more financial institutions; and
  the opt-in distributed ledger application is configured to:
    interact with the private opt-in distributed ledger;
    receive one or more methods of detecting illegal activity from each of the two or more financial institutions;
    receive one or more financial transactions from one of the two or more financial institutions;
    record the one or more financial transactions on the private opt-in distributed ledger;
    activate a smart application on the private opt-in distributed ledger to analyze, through one or more artificial intelligence/machine learning ("AI/ML" algorithms, the one or more financial transactions for one or more indicators of illegal activity; and
    when one or more indicators of illegal activity are found:
      generate a report;
      transmit the report to each of the two or more financial institutions; and
      record the report on the private opt-in distributed ledger.

13. The apparatus of claim 12 wherein each of the one or more financial transactions comprises:
  a. an amount;
  b. an origination; and
  c. a destination.

14. The apparatus of claim 13 wherein each of the one or more financial transactions further comprises one or more related transactions.

15. The apparatus of claim 13 wherein each of the one or more financial transactions further comprises a sender and a recipient.

16. A method for an anti-fraud and anti-money laundering ("AML") opt-in distributed ledger consortium, the method comprising the steps of:
  two or more financial institutions opting into a private distributed ledger, wherein each financial institution shares one or more methods of detecting illegal activity with the private distributed ledger;
  receiving one or more financial transactions from one of the two or more financial institutions;
  recording the one or more financial transactions on the private distributed ledger;
  activating a smart application located on the private distributed ledger to analyze the one or more financial transactions for one or more indicators of illegal activity using one or more artificial intelligence/machine learning ("AI/ML") algorithms; and
  when one or more indicators of illegal activity are found:
    generating a report;
    transmitting the report to each of the two or more financial institutions; and
    recording the report on the private distributed ledger.

17. The method of claim 16 further comprising the steps of:
  analyzing two or more financial transactions recorded on the ledger for one or more patterns of illegal activity; and
  when one or more patterns of illegal activity are discovered:
    generating a pattern report;
    transmitting the pattern report to each of the two or more financial institutions; and
    recording the pattern report on the private distributed ledger.

18. The method of claim 17 further comprising the step of incorporating the pattern report into the smart application.

* * * * *